United States Patent
Englbrecht et al.

(10) Patent No.: US 11,738,710 B2
(45) Date of Patent: Aug. 29, 2023

(54) GAS GENERATOR, AIRBAG MODULE, VEHICLE SAFETY SYSTEM AND METHOD FOR PRODUCING A GAS GENERATOR

(71) Applicant: ZF Airbag Germany GmbH, Aschau a. Inn (DE)

(72) Inventors: Karl Englbrecht, Erharting (DE); Vadim Kolbin, Haar (DE)

(73) Assignee: ZF Airbag Germany GmbH, Aschau a-Inn (DE)

( * ) Notice: Subject to any disclaimer, the term of this patent is extended or adjusted under 35 U.S.C. 154(b) by 0 days.

(21) Appl. No.: 17/295,695

(22) PCT Filed: Oct. 24, 2019

(86) PCT No.: PCT/EP2019/078987
§ 371 (c)(1),
(2) Date: May 20, 2021

(87) PCT Pub. No.: WO2020/114676
PCT Pub. Date: Jun. 11, 2020

(65) Prior Publication Data
US 2021/0402950 A1    Dec. 30, 2021

(30) Foreign Application Priority Data

Dec. 7, 2018   (DE) .......................... 102018131323.3

(51) Int. Cl.
*B60R 21/272*   (2006.01)
*B60R 21/217*   (2011.01)
(Continued)

(52) U.S. Cl.
CPC .......... *B60R 21/272* (2013.01); *B60R 21/217* (2013.01); *B60R 21/2644* (2013.01); *B60R 2021/26076* (2013.01)

(58) Field of Classification Search
CPC . B60R 21/217; B60R 21/2171; B60R 21/262; B60R 2021/2642
See application file for complete search history.

(56) References Cited

U.S. PATENT DOCUMENTS

| | | | |
|---|---|---|---|
| 5,536,040 A * | 7/1996 | Cuevas ................. | B60R 21/272 280/737 |
| 5,683,107 A | 11/1997 | Headley et al. | |

(Continued)

FOREIGN PATENT DOCUMENTS

| | | |
|---|---|---|
| DE | 19631006 A1 | 2/1998 |
| DE | 10392384 T5 | 4/2005 |

(Continued)

OTHER PUBLICATIONS

Machine translation of JP H02-158443. Retrieved Jan. 13, 2021. (Year: 2021).*

(Continued)

*Primary Examiner* — Barry Gooden, Jr.
(74) *Attorney, Agent, or Firm* — Kristin L. Murphy

(57) ABSTRACT

The disclosure relates to a gas generator for a vehicle safety system. The gas generator has a longitudinal axis, an outer housing in the form of a compressed-gas container. In an inoperative state of the gas generator, the housing is filled with compressed gas. The housing is closed at one housing end with a closure element by a welded joint, which extends along the longitudinal axis from the welded joint into the housing. The housing has at least one bead for mechanically relieving the welded joint of load. A bead base of the bead is provided in a region of an axial longitudinal extent of the closure element.

20 Claims, 2 Drawing Sheets

(51) Int. Cl.
   *B60R 21/264* (2006.01)
   *B60R 21/26* (2011.01)

(56) References Cited

U.S. PATENT DOCUMENTS

| | | | | |
|---|---|---|---|---|
| 6,863,303 | B2* | 3/2005 | Yamazaki | B60R 21/261 280/736 |
| 6,871,873 | B2* | 3/2005 | Quioc | B60R 21/261 280/736 |
| 7,210,703 | B2* | 5/2007 | Young | B60R 21/26 102/202.14 |
| 2003/0057690 | A1* | 3/2003 | Dolling | B60R 21/272 280/741 |
| 2003/0213397 | A1* | 11/2003 | Shilliday | B60R 21/23138 102/531 |
| 2006/0087106 | A1 | 4/2006 | Young et al. | |
| 2007/0075535 | A1* | 4/2007 | Trevillyan | B60R 21/272 280/736 |
| 2007/0085309 | A1* | 4/2007 | Kelley | B60R 21/272 280/736 |
| 2008/0296877 | A1* | 12/2008 | Gabler | B60R 21/26 280/739 |
| 2011/0018243 | A1* | 1/2011 | Yano | B60R 21/272 280/741 |
| 2012/0025503 | A1 | 2/2012 | Young et al. | |
| 2012/0187667 | A1* | 7/2012 | Jung | F42B 3/045 280/737 |
| 2012/0292293 | A1* | 11/2012 | Bibo | B23K 11/093 219/117.1 |
| 2016/0016531 | A1* | 1/2016 | Seidl | F42B 3/125 102/202.5 |
| 2017/0166162 | A1* | 6/2017 | Last | B60R 21/274 |
| 2017/0259775 | A1* | 9/2017 | Bierwirth | B60R 21/274 |
| 2019/0351863 | A1* | 11/2019 | Ramp | B60R 21/2646 |
| 2019/0351864 | A1* | 11/2019 | Hillmann | B60R 21/272 |

FOREIGN PATENT DOCUMENTS

| | | | |
|---|---|---|---|
| DE | 102017100857 A1 | 7/2018 | |
| DE | 102018105445 A1 | 9/2019 | |
| JP | H02158443 A | 6/1990 | |
| WO | WO-2004078535 A1 * | 9/2004 | B60R 21/26 |

OTHER PUBLICATIONS

International Search Report and Written Opinion for PCT/EP2019/078987 dated Dec. 13, 2019 (12 pages; with English translation).

* cited by examiner

GAS GENERATOR, AIRBAG MODULE, VEHICLE SAFETY SYSTEM AND METHOD FOR PRODUCING A GAS GENERATOR

CROSS-REFERENCE TO RELATED APPLICATIONS

This application is a national stage of International Application No. PCT/EP2019/078987, filed Oct. 24, 2019, the disclosure of which is incorporated herein by reference in its entirety, and which claims priority to German Patent Application No. 102018131323.3, filed Dec. 7, 2018, the disclosure of which is incorporated herein by reference in its entirety.

TECHNICAL FIELD

The disclosure relates to a gas generator, in particular for a vehicle safety system. The disclosure further relates to an airbag module including a gas generator, as well as to a vehicle safety system including a gas generator. A method for producing a gas generator is also disclosed.

BACKGROUND

Gas generators, in particular gas generators for a vehicle safety system, are known which are intended to provide or generate a specified amount of gas as intended, when an activation signal is present, to fill, for example, an inflatable airbag with gas to protect e.g., a person from impacting on component parts of the vehicle and, resp., to mitigate such impact. In this context, gas generators with a longitudinal axis are known. For example, there are known gas generators that are tube-shaped, include an outer housing in the form of a compressed-gas container which, in an inoperative state of an inflator, is filled with compressed gas. The housing of such a known gas generator is closed at one housing end with a closure element by a welded joint, the closure element extending along the longitudinal axis from the welded joint into the housing.

The term "in the inoperative state" used herein means that the gas generator is filled with pressurized gas, viz. the compressed gas, before its intended activation or release by an activation signal, as it is the case, for example, during a collision of a vehicle in which the gas generator is installed. To prevent the preloaded compressed gas from unintentionally escaping from the gas generator or, resp., the housing of the gas generator before the gas generator is activated, this housing, which is in the form of a compressed-gas container, is closed in a pressure-tight manner by the closure element which is attached to or welded with the housing end of the housing by the welded joint. Those gas generators containing a preloaded compressed gas are also known as hybrid gas generators.

It is further known for those gas generators that they may also include, at their outer housing, a recess or a bead which is configured for cooperation or interaction with another component part of the gas generator. More specifically, such known bead in the outer housing of the gas generator is in direct contact with the other component part of the gas generator. Such bead can serve, for example, as a means for positioning of fastening the other component.

An example of such a known gas generator is disclosed, for example, in DE 10 2017 100 857 A1. The gas generator disclosed therein has a longitudinal axis and an outer housing in the form of a compressed-gas container which, in the inoperative state of the gas generator, is filled with compressed gas. The housing is closed at one housing end with a closure element by a welded joint, the closure element extending along the longitudinal axis from the welded joint into the housing. In addition, the disclosed gas generator includes at its outer housing a peripheral bead which serves as a support for another component positioned in the interior of the housing which is a limit disk. The limit disk contacts the bead along its periphery and rests on the same. In other words, said known bead forms a stop or a positioning element for fastening a component part of the gas generator supported in the interior of the gas generator. Such known bead thus is configured to cooperate or to interact with another component part of the gas generator and is in direct contact with the other component part of the gas generator.

However, a drawback of such gas generator as disclosed, for example, in DE 10 2017 100 857 A1, is that the welded joint between the closure element and the housing end of the outer housing of the gas generator, which is in the form of a compressed-gas container, must be designed in a relatively expensive, especially solid manner and with a relatively large cross-sectional surface to satisfy known load cycling tests. The term "load cycling test" means that within the scope of a specification for the known gas generator sometimes a test has to be carried out in which the gas generator is subjected to a plurality of cycles of changing ambient temperatures, which is intended to simulate, at least partially, a range of its life cycle until its activation. More specifically, it is meant that by changing temperature cycles to which the gas generator is subjected, the internal pressure of the gas generator, especially of its outer housing in the form of a compressed-gas container, is correspondingly cyclically increased or decreased. The housing of the compressed gas tank is thus elastically deformed appropriately outwardly (when the pressure is increased by temperature increase) or inwardly (when the pressure is reduced by temperature reduction), especially also in the direct vicinity of the welded joint. Thus, the welded joint is appropriately loaded with mechanical tensile stress and compressive stress in cyclic alternation. The gas generator is intended to be occasionally successful in such a load cycling test by the welded joint, which closes the compressed-gas container to the outside in a pressure-tight manner, maintaining its intended function, in particular qualitative tightness, during and, resp., after the load cycling test.

Against this background, what is needed a gas generator that overcomes and, resp., reduces the afore-mentioned drawback and/or an optimized design for the gas generator in which the strength of the welded joint is increased.

An improved airbag module and vehicle safety system is also needed. In addition, a method for producing a gas generator which overcomes at least one of the afore-mentioned drawbacks is also needed.

SUMMARY

A gas generator, such as a gas generator for a vehicle safety system is disclose. The gas generator includes a longitudinal axis, an outer housing, which may be in the form of a compressed-gas container and which, in an inoperative state of the gas generator, is filled with compressed gas. The outer housing is closed at one housing end with a closure element by a welded joint, and the closure element extends along the longitudinal axis from the welded joint into the housing. The housing has at least one bead for mechanically relieving the welded joint of load, with a bead base of the bead being provided in a region of an axial longitudinal extension of the closure element. In this context, the bead base is meant to be a position having a maximum inwardly directed recess in the region of the bead in the outer housing.

The prevailing expert opinion has been that any bead has to be avoided, where possible, in an outer housing of a compressed-gas container of a known gas generator mentioned, as the structure of the outer housing is unnecessarily weakened by such "unnecessary" bead. Accordingly, a bead has been introduced to an outer housing of a known gas generator, which is in the form of a compressed-gas container, only when said bead was essential for cooperation or interaction with another component part of the gas generator and had to serve, for example, as a stop member, positioning means and/or fastener for a further component part arranged inside the housing or the compressed-gas container. This is illustrated, for example, by a limit disk as known from the afore-described DE 10 2017 100 857 A1.

Surprisingly, and contrary to traditional thought, with the arrangement of the present disclosure, however, it has been discovered that it may be of advantage to provide a bead in the compressed-gas container for the purpose of mechanically relieving a weld. In particular, it has turned out with respect to the above-mentioned load cycling test that a weld by which a closure element closes a housing end of the compressed-gas container and, resp., of the outer housing of the gas generator can be advantageously relieved in terms of mechanical stresses by the load cycling test with a bead arranged relatively close to the weld in the housing. The bead, which in one exemplary arrangement, serves solely for mechanical relief of the welded joint can help advantageously compensate for tensile stresses and/or compressive stresses which are naturally exerted on the welded joint by the load cycling test, and accordingly by incorporating the bead, more cycles of a load cycling test can be positively passed. Consequently, the weld can pass a longer and tougher load cycling test through the bead without complaint. The at least one bead of the gas generator according to one exemplary arrangement, thus has a bead base which, when viewed from outside, is understood to be at a deepest point or a point having a maximum bead depth of the at least one bead, with the bead base being arranged in a region of an axial longitudinal extent of the closure element. The at least one bead is positioned, by said arrangement and, resp., axial positioning of the bead and, resp., its bead base, such that it can serve for a proper mechanical relief of the welded joint.

The outer housing of the gas generator may be a compressed-gas container which, in the inoperative state of the gas generator, i.e., when the latter has not yet been activated as intended, includes a preloaded pressurized gas or gas mixture. Accordingly, the gas generator according to one exemplary arrangement, is in the form of a hybrid gas generator which may include a gas or gas mixture selected from the group of argon, helium, oxygen or nitrogen, for example at a pressure of 550 bars at room temperature. In particular, the gas generator according to one exemplary arrangement, may be a tubular gas generator whose outer housing corresponds substantially to an elongate tube whose longitudinal extension may be a multiple of its extension in a radial direction.

In one exemplary arrangement, the at least one bead of the gas generator according to one exemplary arrangement has no further functions specific to the gas generator. This means that the at least one bead serves solely for mechanical relief of the weld, as afore-described, and has no further jobs or functions for the gas generator. In particular, it does not fulfill the function of a means for cooperation or interaction with another component part of the gas generator and therefore does not serve as a positioning, as a stop or a means for fixing and, resp., fastening other component parts like the prior art.

In particular, the outer housing of the gas generator is tube-shaped, with the at least one bead being a recess extending from outside to radially inside.

In one exemplary arrangement of the gas generator, the welded joint can be in the form of a butt joint, and in one exemplary arrangement, a partially overlapping butt joint. More specifically, the housing end of the housing with its end-side cross-sectional surface there can abut or be adjacent either fully or partially overlapping on or to a corresponding mating surface of the closure element, where or by which it is closed by the weld. Thus, the weld is formed by a butt joint joining of the mating surfaces to be welded, in contrast to a welded joint in the form of a "T-joint". With this arrangement, an advantageous effect of the at least one bead can be observed especially efficiently with respect to the mechanical relief of the welded joint for the welded joint in the form of a butt joint, especially a partially overlapping butt joint, because here the tensile and/or compressive stresses in the described load cycling test have an effect other than for a different type of welded joint, such as a welded joint in the form of a "T-joint".

In one exemplary arrangement, the closure element is configured as a region of the outer housing of the gas generator. The closure element can form an end-side closure or an end-side end of the gas generator and thus can also be an axial or end-side termination of the compressed-gas container. In addition, the closure element can also be an igniter unit and in one exemplary arrangement, comprising a pyrotechnical booster charge, which may be in the form of a loose fill of pyrotechnical molded bodies, and in one exemplary arrangement, an electric pyrotechnical igniter as a pre-mounted assembly. Both assemblies, viz. the electric pyrotechnical igniter and the booster charge, can also be present in the form of one single, correspondingly larger structural unit, a highly charged igniter with a correspondingly larger amount of pyrotechnics.

Also, in one exemplary arrangement, the closure element can protrude outwardly from the outer housing along the longitudinal axis. Accordingly, the closure element can be an axial end piece of the entire gas generator.

In particular, the closure element can be a solid component part which in the region of the welded joint, when viewed in a cutting plane normal to the longitudinal axis of the gas generator, has a larger material thickness than the housing end, and in one exemplary arrangement a 1.2 to 3-fold larger material thickness of the housing end, In yet a further exemplary arrangement, the closure element, in the region of the welded joint, as a larger material thickness than the housing end in a 1.5 to 2.5-fold range. In a further exemplary arrangement, the closure element, in the region of the welded joint, as a larger material thickness than the housing end is a 2-fold, material thickness of the housing end. By designing the closure element in the region of the welded joint to be thicker and heavier than the housing and, resp., the housing end appropriately welded there with the closure element, the closure element will behave, during a load cycling test and thus a variation of the internal pressure of the compressed-gas container, also differently there and will correspondingly elastically deform less strongly than the thinner housing end. This means that the at least one bead here enables the welded joint to be mechanically relieved, in contrast to a case in which the two component parts, viz. the closure element and the housing end, would have an approximately similar material thickness, or the closure element would even have a smaller material thickness.

In one exemplary arrangement of the disclosure, plural beads are arranged radially peripherally on the housing, and in exemplary arrangement, at a substantially equal axial position along the longitudinal axis of the gas generator. In one exemplary arrangement, this arrangement can be formed, for example, by one single production step by a crimping tool that is converged inwardly from the outside, which has a corresponding number of crimping jaws for the number of beads to be produced, without the tool or the housing of the gas generator having to be made to rotate. Such an arrangement promotes manufacturing efficiency.

As an alternative, the at least one bead can be configured as a continuous radially peripheral recess which reduces an outer diameter of the housing in the region of the bead to a bead diameter. Accordingly, for producing such peripheral bead, a roller-burnishing tool may be utilized which introduces the respective bead into the housing in one or more radially peripheral roller-burnishing steps.

In one exemplary arrangement, the bead base is positioned toward the housing end at an axial distance in a range from 5 mm to 30 mm. In yet another exemplary arrangement, the bead base is positioned toward the housing end at an axial distance in a range from 10 mm to 20 mm. In still a further exemplary arrangement, the bead base is positioned toward the housing at an axial distance of approximately 15 mm. In all of the foregoing arrangements, the bead base may be arranged substantially in the middle of the axial longitudinal extension of the closure element. Such a relatively close position of the bead base and, resp., of the bead itself toward the housing end and thus toward the weld there, helps bring about optimum mechanical relief of the welded joint. In one exemplary arrangement, the maximum radial recess is formed at the position of the bead base as a bead depth, especially having a depth ranging from 0.5 mm to 2 mm. In one exemplary arrangement, the depth is approximately 1 mm.

One exemplary arrangement has a bead base formed by a first bead flank and a second bead flank. The two bead flanks are outer portions of the housing converging obliquely radially inwardly which meet at a radius, and in one exemplary arrangement, the radius has a value in the range from 1 mm to 4 mm at the position of the bead base. In a further exemplary arrangement, the radius has a value of 2 mm, at the position of the bead base. In yet a further exemplary arrangement, the at least one bead has a bead opening angle in the range of 160° to 170°. In one exemplary arrangement, the bead opening angle is approximately 165°.

With these afore-mentioned arrangements, an optimum mechanical relief of the welded joint can be achieved, and an optimum high strength of the welded joint at or after a load cycling test can be achieved.

In one exemplary arrangement, the at least one bead is configured as a plastic deformation, which may be embodied in the form of a crimping, flaring, embossing or roller-burnishing at the outer housing of the gas generator, wherein the at least one bead is movable outwards, especially in the direction of a movement direction substantially normal to the longitudinal axis of the gas generator, when the pressure inside the gas generator is increased. Thus, the region of the outer housing of the gas generator, where the bead is arranged, can be deflected radially outwardly and radially inwardly quasi in the form of a "knee joint" and can be moved elastically along with a corresponding change of internal pressure within the compression-gas container, as it is the case in the afore-described load cycling test. Thus, the joint can absorb part of the mechanical stresses, especially tensile and/or compressive stresses, and thus adequately relieve the welded joint.

The welded joint may be configured, such as, for example, radially peripherally, as a laser weld, resistance weld or friction weld. In a further exemplary arrangement, the welded joint may be a MIG, MAG or ultrasonic weld.

Another aspect of the disclosure relates to an airbag module comprising an airbag inflatable by the gas generator and a fastener for attaching the airbag module to a vehicle. This arrangement provides advantages similar to those already described in connection with various arrangements of the gas generator.

An additional independent aspect of the disclosure relates to a vehicle safety system, in particular a safety system for the protection of a person such as a vehicle occupant or a pedestrian, that comprising an airbag inflatable by the gas generator according to the disclosure as part of an airbag module, and an electronic control unit by which the gas generator may be activated pursuant to a predetermined release event. This arrangement provides advantages similar to those described already in connection with the gas generator arrangements described above.

Another independent aspect of the disclosure relates to a method for producing a gas generator, in particular a gas generator according to the disclosure, comprising the steps of:

a) providing an outer tubular housing for the gas generator which includes a housing end on an axial side, the housing end being an opening of the housing;

b) producing at least one bead from outside in the housing, the at least one bead mechanically relieving a welded joint and not used for any other functions specific to the gas generator, such as positioning, fastening or orientation.

In step b), the at least one bead can be produced in the form of a crimping, flanging, embossing or roller-burnishing.

In one exemplary arrangement, the at least one bead can be produced in the form of plural beads radially peripherally, especially at a substantially equal axial position along a longitudinal axis of the gas generator, or in the form of a continuous radially peripheral recess which reduces the outer diameter of the housing in the region of the at least one bead to a bead diameter.

It is possible that the outer housing for the gas generator may be provided as part of an already pre-mounted gas generator assembly in which the housing is a compressed-gas container that is filled with a compressed gas, preferably at a pressure ranging from 400 bars to 600 bars, and is outwardly closed in a pressure-tight manner, preferably radially peripherally, by a welded joint.

In one exemplary arrangement, the outer housing for the gas generator may also be provided as a separate component part, with the following further steps being taken after producing the at least one bead:

a) installing further component parts for the gas generator within the housing;

b) filling the housing with a compressed gas, and in one exemplary configuration, filling the housing with compressed gas at a pressure ranging from 400 bar to 600 bars;

c) closing the housing in a pressure-tight manner at the housing end and the other end of the housing axially opposed to the housing end; and d) optionally further mounting additional component parts for the gas generator. In one exemplary arrangement, the further mounting additional components parts further includes arranging a diffusor at the end side, to the housing.

Such a production method offers the advantage that the weld is mechanically preloaded already by the at least one bead, before the compressed gas is filled into the housing. Accordingly, the mechanical stresses can be adapted or can be so high in the welded joint that, after the filling with compressed gas, the maximum stresses are below a value of a comparable welded compressed-gas container which is not provided with a bead for mechanically relieving the welded joint. Moreover, in this case no reversal of the mechanical stress can take place in the filled compressed-gas container and at the lowest specified temperature in the load cycling test described at the outset, especially at a temperature of −40° C. This means that here in the load cycling test mechanical stress peaks are advantageously reduced or "cut off" and thus strength of the welded joint with respect to the load cycling test can be increased.

BRIEF DESCRIPTION OF THE DRAWINGS

Hereinafter, the disclosure shall be illustrated in detail with reference to the attached schematic Figures; wherein.

DETAILED DESCRIPTION

Figure 1:
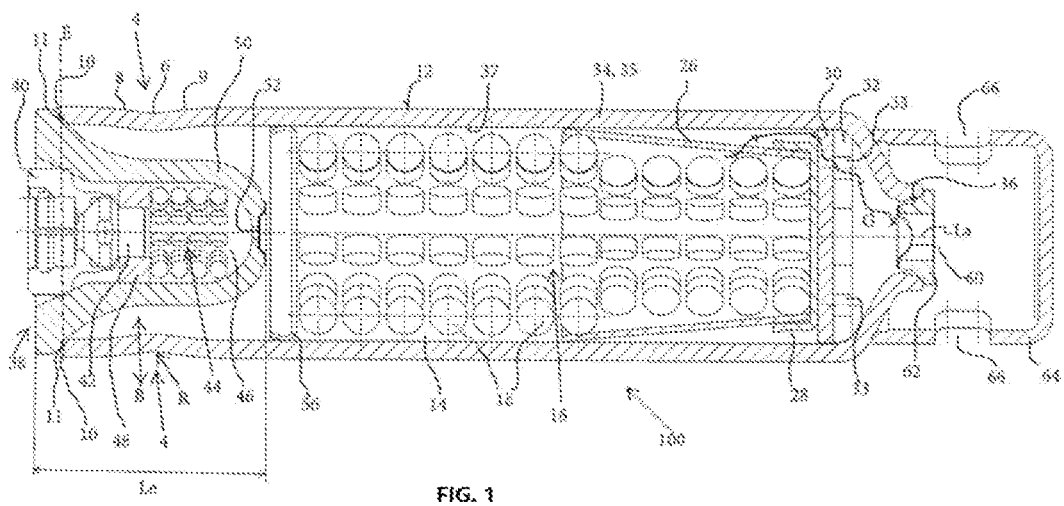
FIG. 1 shows a longitudinal section view across an exemplary arrangement of a gas generator according to the disclosure.

In the following, like reference numerals will be used for like and equally acting component parts.

FIG. 1 shows a longitudinal section across a gas generator 100 with a longitudinal axis La and with an outer housing 34 which may have a tubular or substantially cylindrical structure. A closure element 50 including a first burst element 52 is arranged on an end face of the housing 34 to close the housing 34 in a pressure-tight manner at its respective housing end 10. In one exemplary arrangement, welded joint 11 closes the housing 34 in a pressure-tight manner. At an end of the housing 34 axially opposed to the housing end 10, a discharge opening 36 is formed which is closed in a pressure-tight manner by a closure member 62 having a second burst element 60. In one exemplary arrangement, the second burst element 60 is welded to the closure member 62 and the closure member 62 is welded to the discharge opening 36. Accordingly, all of the component parts of closure element 50, first burst element 52, closure member 62 and second burst element 60 are made from metal. In one exemplary arrangement, these components are made from steel. The housing 34 of the gas generator 100 is filled, in the inoperative state of the gas generator, viz. prior to activation thereof, with a compressed gas or a compressed gas mixture. In one exemplary arrangement, the compressed gas or compressed gas mixture is filled at a pressure of 400 to 600 bars at room temperature, so that the housing 34 also forms a compressed-gas container 35.

In one exemplary arrangement, the closure element 50 is a solid component of metal having a material thickness which, at least over a partial region of the closure member 50, is larger than the material thickness of the housing 34. In one exemplary arrangement, the in the region of the welded joint 11, when viewed in a cutting plane E located normal to the longitudinal axis La of the gas generator 100, the material thickness of the housing end 10 is approximately 2.5 times the material thickness of the closure element 50 in the cutting plane E. The closure element 50 may be a rotationally symmetric component in the form of a cap which extends with cap base into the housing 34 along and, resp., in parallel to the longitudinal axis La of the gas generator 100. The cap base of the closure element 50 has a relatively small central opening which is closed through the first burst element 52 in a pressure-tight manner. In one exemplary arrangement, the first burst element 52 is welded onto the closure element 50.

The closure element 50 is welded to the housing 34 so that it is attached or positioned from the outside to the housing end 10 and is welded with or to the housing end 10. In one exemplary arrangement, the weld is in the form of a butt joint and may be a radially peripheral continuous weld. Accordingly, the closure element 50 does not completely cover the radial cross-sectional area of the housing end 10, but the radial cross-sectional area of the housing end 10 protrudes radially outwardly from a radial end contour of the closure element 50 so that a welded joint 11, for example in the form of a partially overlapping butt joint, is formed. Hence, the closure element 50 also is and acts as a part or a region of the outer housing 34 of the gas generator 100.

In one exemplary arrangement, the closure element 50 is configured, as shown in FIG. 1, as an igniter unit 38 which can be provided as a pre-fabricated structural unit when mounting the gas generator 100. In such an arrangement, the igniter unit 38 comprises a number of component parts. More specifically, the igniter unit 38 comprises an igniter 42 which is installed in and held or fixed by an igniter carrier 40, a pyrotechnic booster charge 44 received in an ignition chamber 46, and a filling body 48 axially positioned between the booster charge 44 and the igniter carrier 40. In one exemplary arrangement, the igniter 42 is configured as a compressible element, such as from silicone foam, to fix the booster charge 44 in its position and, resp., to act as an appropriate volume compensating means for the booster charge 44 when producing the gas generator 100. In another exemplary arrangement not shown here, the booster charge 44 may also be dropped or may be directly integrated in the igniter 42 which, in such case, is appropriately longer as a so-called highly charged igniter and can extend almost over an entire inner length of the closure element 50. The igniter carrier 40 may be made from metal, and in one exemplary arrangement, from steel, and is welded to the closure element 50.

In the outer housing 34 of the gas generator 100, a bead 4 including a bead base 6, a first bead flank 8 and a second bead flank 9 is formed. The two bead flanks 8, 9 are outer portions of the housing 34 converging obliquely radially inwardly which meet and, resp., merge into each other, at a radius R at the position of the bead base 6. The bead 4 as shown in FIG. 1 is a radially peripheral continuous bead or recess which extends from outside radially inwardly and in the bead base 6 has its maximum depth, viz. the bead depth T (see FIG. 2). The outer diameter of the housing 34 is reduced there, i.e., at the position of the bead base 6, to a bead diameter D (see FIG. 2) which also forms the minimum outer diameter of the entire bead 4 and, resp., of the respective total axial longitudinal extent of the bead 4.

The bead base 6 is arranged in a region of an axial longitudinal extent Le of the closure element 50, substantially in the middle thereof, in the housing 34. The bead 4 as thus shown in FIG. 1 serves solely for mechanically relieving the welded joint 11. In so doing, tensile stresses and/or compressive stresses which are naturally exerted on the welded joint by a cyclic load cycling test, can be advantageously compensated, and the bead helps positively pass respectively more cycles of a load cycling test, as already previously explained. The bead 4 and, resp., the bead base 6 thereof are positioned relatively close to the welded joint 11 and, resp., the cutting plane E to advantageously bring about the mechanical relief of the welded joint 11.

The bead 4 is movable outwardly when pressure is increased inside the gas generator 100 and is movable inwardly when pressure is reduced inside the gas generator 100, especially toward a direction of movement B substantially normal to the longitudinal axis La of the gas generator 100. This is illustrated in FIG. 1 by the double arrow symbol with reference numeral "B". More specifically, in a gas generator 100 as shown in FIG. 1 the internal pressure of the gas generator 100 and, resp., the internal pressure of the compressed-gas container 35 increases with a temperature increase, and the housing 34 of the gas generator 100 performs or is subjected to a natural corresponding expansion or compensation movement to the outside. In this process, the bead 4 is correspondingly also moved outwardly or displaced outwardly, which is illustrated by the arrow symbol outwards for the direction of movement B. The bead 4 is correspondingly inversely (i.e., in the opposite direction) moved when the internal pressure of the gas generator 100 and, resp., the internal pressure of the compressed-gas container 35 decreases with a temperature decrease, for example, as the case in the load cycling test described above. Thus, the bead 4 can be deflected radially outwardly and radially inwardly in the direction of movement B for example, in the manner of a "knee joint" and can be elastically moved along with a corresponding change of internal pressure inside the compressed-gas container 35, and thus can absorb part of the mechanical stresses, especially tensile and/or compressive stresses, which are caused by the load cycling test, and thus can appropriately relieve the welded joint 11.

A gas flow element 56 which, as an axial and substantially planar element, abuts on an inner face 37 of the housing 34 along its radial periphery, for example by force fit and delimits an axially downstream combustion chamber 14 toward the closure element 50 and is arranged axially downstream of the igniter unit 38 and the closure element 50. The combustion chamber 14 comprises a plurality of individual fuel bodies 18 which together form a fuel bed 16. The gas flow element 56 may be a disk-shaped perforated sheet or expanded metal, for example, and is inserted or press-fitted into the housing 34 from the side of the housing end 10 until t abuts on part of the fuel bodies 18 and maintains them, and thus also the entire fuel bed 16, at a predetermined position.

The fuel bed 16 is surrounded by a fuel cage 26 along a majority of its axial extension. The fuel cage 26 is in the form of a gas-permeable tapered hollow, such as made from perforated sheet or expanded metal, and is mounted to be aligned such that a wider open end faces the gas flow element 56. An opposite narrower open end of the fuel cage 26 is covered to be closed by a combustion chamber bottom 28 which is considered to be a type of lid or closure for the fuel cage 26 and is configured as a pot-shaped gas-impermeable metal part. The fuel cage 26 assembled with the combustion chamber bottom 28 in this case also has, inter alia, the function of a container for the fuel bodies 18 and, resp., can be used, during production of the gas generator 100, as a type of hopper or filling receptacle for the fuel bodies 18.

A filter 30 in the form of a substantially disk-shaped component is positioned axially downstream of the combustion chamber bottom 28 and in one exemplary configuration, is made from metal, for example as knitted mesh, wire mesh, perforated sheet or expanded metal. The filter 30 forms a filter which is extremely thin and space-saving in its axial extension and preferably acts as a filter for particles and gases.

An end disk 32 of metal having plural through-holes 33 is arranged axially downstream of the filter 30. In one exemplary arrangement, the end disk 32 is substantially in the form of a flat disk and is adjacent to a portion of the housing 34 of the gas generator 100 that merges from a cylindrical region into a conical region. The end disk 32 may merely rest or abut on the housing 34 in this portion, or may also be press-fitted there for better fixation. Advantageously, the contour of the end face of the end disk 32 which faces away from the filter 30 is adapted to the contour of the housing 34 in the portion of the afore-mentioned transition from the cylindrical to the conical region. The end disk 32 may also be considered a termination or terminating element of the combustion chamber 14 in the axial direction.

As described above, the housing 34 of the gas generator 100 has, at the axial end opposite to the housing end 10 closed by the closure element 50, a radially inwardly tapered contour which ends in the discharge opening 36 which can also be regarded as the whole discharge opening for combustion gas and, resp., gas to be discharged from the compressed-gas container 35. The discharge opening 36 is closed in a gas-tight manner in the inoperative state, viz. prior to release or activation of the gas generator 100, by the closure member 62 and the second burst element 60 firmly connected thereto.

The gas generator 100 shown in FIG. 1 and, resp., the compressed-gas container 35 thereof is filled, in the inoperative state of the gas generator 100, with a preloaded compressed gas or gas mixture from the group of argon, helium, oxygen or nitrogen, for example, at a pressure of 550 bars at room temperature. Such pre-stored compressed gas is also referred to as cold gas. Thus, the design of the gas generator 100 according to an exemplary arrangement of the disclosure shows a so-called hybrid gas generator in FIG. 1. The respective axially facing gas-tight closures for the compressed-gas container 35, on the one hand, constitute the closure element 50 with the first burst element 52 and, on the other hand, the closure unit comprising the closure member 62 with the second burst element 60. Hence, the compressed gas which is thus also present between and surrounds, resp., the fuel bodies 18 is provided inside said two gas-tight closures.

Axially downstream of the axial end of the housing 34 of the gas generator 100 which includes the closure member 62, a diffusor 64 having discharge openings 66 is firmly connected to an outer face 12 of the housing 34, wherein the diffusor 64 may be welded to the housing 34, such as by laser welding, friction welding or resistance welding, or, alternatively, may be fastened there by a force-fit and/or form-fit connection such as a crimped or roller-burnished connection. The diffusor 64 can also be configured as a continued outer housing of the gas generator 100 and, by its discharge openings 66, which may also alternatively be configured as only one single discharge opening 66, enables gas discharge from the gas generator 100 into the surroundings thereof, especially into an airbag to be inflated (not shown) connected to the gas generator 100.

The functioning of the gas generator 100 according to the disclosure will now be described as follows by way of FIG. 1. When an activation signal is given which moves the gas generator 100 from an inoperative position into an activation state or release state, initially the igniter 42, which may be prefabricated structural unit that may comprise one or more pyrotechnical charges (not shown), is activated by generating inside the igniter 42 an appropriately high pressure which opens or tears open part of the outer sleeve of the igniter 42 and releases hot ignition gases and, resp., ignition particles which ignite the booster charge 44 and cause combustion thereof. Inside the ignition chamber 46 an internal pressure then builds up which opens or tears open the first burst element 52, when a respective limit is exceeded, to guide hot ignition gases and, resp., ignition particles into the combustion chamber 14, especially toward the axially closest fuel bodies 18. In this context, it is also contemplated that the booster charge 44 is not formed, as shown in FIG. 1, separately from the igniter 42, but is already integrated in the latter, thus allowing an appropriately axially longer igniter 42 to be formed, where appropriate, than it is shown in FIG. 1. Then the fuel bodies 18 are ignited and burnt, and a corresponding formation of gas and, resp., combustion gas takes place. The (hot) gas formed helps increase the internal pressure inside the combustion chamber 14 relatively quickly so that, in addition to the pressure of the pre-stored compressed gas prevailing in the combustion chamber 14 already in the inoperative state of the gas generator, further pressure or excess pressure is formed such that, when a respective pressure threshold is exceeded, the second burst element 60 is opened. In one exemplary arrangement, initially only a certain proportion of the compressed gas previously stored in the compressed-gas container 35, i.e., part of the cold gas, is discharged into the diffusor 64 to be guided further into an inflatable airbag or an airbag module (not shown). This results advantageously in a small mechanical initial load for the airbag and, resp., the airbag module, as consequently a virtually "gentle" initial deployment of the airbag and, resp., a "gentle" opening of the airbag module is allowed. Only after a certain amount of cold gas has flown out of the housing 34 through the discharge opening 66, can hot gas that is formed by combustion of the fuel bodies 18 virtually flow in and equally leave the housing 34 and the diffusor 64 so as to completely fill the airbag as intended. Such a discharge characteristic of gas from the gas generator or such a pressure-performance curve resulting from the fact that initially only a particular small amount of gas is released from the gas generator and later in time a larger amount of gas will virtually flow in, is also known by the term "S-slope" and is generally deemed to be highly advantageous, as in this way an airbag to be inflated and, resp., an airbag module comprising the latter can be filled initially gently with gas in order to allow, after a certain period, the residual amount of inflation gas to flow in.

As depicted in FIG. 1, the generated gas flows along a gas flow G the flow path of which is shown by a line interspersed with several arrow symbols. Accordingly, the gas or, resp., inflation gas flows out of the inner region of the fuel cage 26 through the conical gas-permeable sidewalls thereof toward the filter 30. It is possible here, of course, that the gas flows along the entire longitudinal extension of the fuel cage 26 out of the interior thereof, where a major part of the further fuel bodies 18 is stored, through the gas-permeable sidewalls of the fuel cage 26 to the exterior thereof so as to flow in the space formed by the fuel cage 26 and the inner face 37 of the housing 34 of the gas generator 100 toward the filter 30. After that, the generated gas can flow through the filter 30, thus causing the gas to be further cooled and, resp., filtered, so that it can flow through the through-holes 33 and further through the discharge opening 36 into the interior of the diffusor 64, because the second burst membrane 60 has already been opened by excess pressure, as described above. The generated gas now can mix, in the interior of the diffusor 64, with the cold gas or, resp., a residual amount of the cold gas which is still present at this time in the compressed-gas container 35 and which flows substantially simultaneously with the generated gas equally through the discharge opening 36 into the interior of the diffusor 64, and then can leave the diffusor 64 through the discharge openings 66 thereof into the outer region of the gas generator 100 and flow into an inflatable airbag (not shown). The diffusor 64 also serves as a mixing chamber for generated gas and pre-stored compressed gas (cold gas).

As an alternative, it is also possible that the combustion of the fuel bodies 18 takes place so quickly that even correspondingly quickly a correspondingly formed gas (combustion gas) is formed at the end of the compressed-gas container 35 and, resp., has flown there so that, when the second burst element 60 opens, pre-stored cold gas and formed gas (combustion gas) can flow substantially simultaneously through the discharge opening 36.

Figure 2:
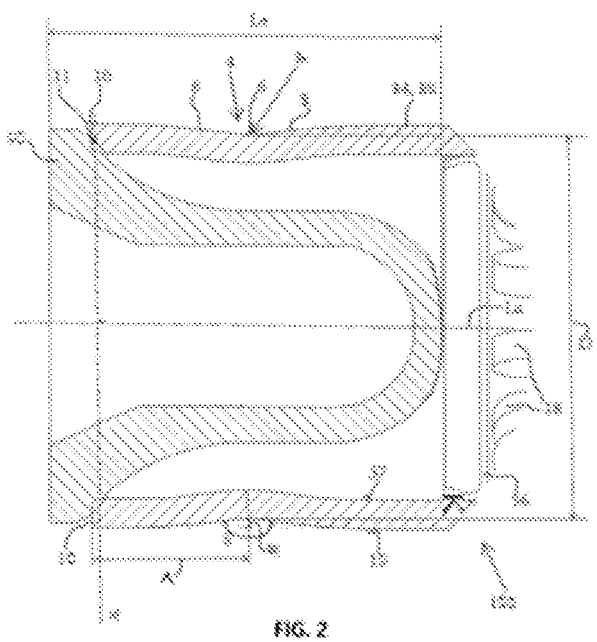
FIG. 2 shows an enlarged representation of a section of the gas generator according to the disclosure, where the number of component parts shown is reduced.

FIG. 2 illustrates an enlarged representation of a section of the gas generator according to the disclosure as shown in FIG. 1 with a reduced number of component parts being shown. More specifically, FIG. 2 shows the housing 34 that is closed with the closure element 50 by the welded joint 11. For the sake of clarity, the closure element 50 is shown without any internal component parts such as the igniter, igniter carrier and booster charge, and with a simplified cap base without the first burst element. In addition, a section of the gas flow element 56 and the fuel bodies 18 is further shown. FIG. 2 illustrates the design and the position of the bead 4, as described above with respect to FIG. 1, and in detail below. The bead 4 is positioned as a radially peripheral recess with its bead base 6 at a distance A axially from the housing end 10. The distance A is selected such that the bead 4 is positioned to be sufficiently close to the welded joint 11 to cause the above-described mechanical relief of the welded joint 11. More specifically, in one exemplary arrangement, the bead base 6 is positioned at a distance A of from 5 mm to 30 mm. In a further exemplary arrangement, the distance A is from 10 mm to 20 mm. In yet a further exemplary arrangement, the distance A approximately 15 mm from the housing end 10. In addition, the bead 4 has, at the position of its bead base 6, the bead depth T as its maximum recess relative to the outer diameter of the housing 34 surrounding the bead 4, the bead depth T having a value ranging from 0.5 mm to 2 mm. In another exemplary arrangement, the bead depth T has an optimum value of 1 mm. At the position of the bead base 6, the bead diameter D is configured as minimum outer diameter of the bead 4. With a substantially continuous outer diameter of the housing 34 of 40 mm adjacent to the bead 4, the bead diameter D may have a value ranging from 37 mm to 39 mm. In one exemplary arrangement, the bead diameter has a value of 38 mm.

The above values for the parameters of distance A of 15 mm, bead depth of 1 mm and bead diameter D of 38 mm have resulted from various tests and simulations with respect to a burst behavior concerning the gas generator according to the disclosure as an optimum design of the bead 4 to achieve an optimum mechanical relief of the welded joint 11. More specifically, the afore-mentioned parameters were altered and varied, and the mechanical stresses on and, resp., in the region of the welded joint 11 were measured in each case. In addition, the associated burst behavior of the generator was considered, wherein the housing of the gas generator was loaded by simulation until the mechanical structure and the strength thereof failed.

FIG. 2 moreover illustrates the bead 4 having a bead opening angle S that is measured between the first bead flank 8 and the second bead flank 9 and illustrates the bead flanks 8, 9 to converge relatively flatly. More specifically, the bead opening angle S has a value ranging from 160° to 170°, and the afore-mentioned simulation has resulted especially in an optimum bead angle of 165°.

The invention claimed is:

1. A gas generator for a vehicle safety system, with a longitudinal axis, an outer housing in the form of a compressed-gas container which, in an inoperative state of the gas generator, is filled with compressed gas, wherein the outer housing is closed at one housing end with a closure element by a welded joint, wherein the closure element extends along the longitudinal axis from the welded joint into the outer housing and protrudes outwardly from the outer housing along the longitudinal axis, wherein the outer housing has at least one bead for mechanically relieving the welded joint, wherein a bead base of the bead is arranged in a region of an axial longitudinal extent of the closure element and wherein the bead has a bead opening angle with a value ranging from 160° to 170°.

2. The gas generator of claim 1, wherein the plurality of beads are positioned at substantially equal axial positions along the axial longitudinal extent.

3. A gas generator for a vehicle safety system, with a longitudinal axis, an outer housing in the form of a compressed-gas container which, in an inoperative state of the gas generator, is filled with compressed gas, wherein the outer housing is closed at one housing end with a closure element by a welded joint, wherein the closure element extends along the longitudinal axis from the welded joint into the outer housing, wherein the outer housing has at least one bead in the form of a continuous radially peripheral recess, wherein the bead can be moved elastically along with a corresponding change of internal pressure within the compressed-gas container for mechanically relieving the welded joint in a manner of a knee joint, wherein a bead base of the bead is arranged in a region of an axial longitudinal extent of the closure element, and wherein a bead base of the at least one bead is positioned toward the housing end at an axial distance of from 5 mm to 30 mm and is disposed substantially in a middle of the axial longitudinal extent of the closure element.

4. The gas generator according to claim 3, wherein the bead base is formed by a first bead flank and a second bead flank, wherein the first and second bead flanks are defined by obliquely radially inward converging outer portions of the outer housing which meet at a radius having a value ranging from 1 mm to 4 mm, at the position of the bead base.

5. A method for producing a gas generator, comprising the steps of:
 a) providing an outer housing for the gas generator which has a housing end on an axial side, the housing end defining an opening of the outer housing;
 b) producing at least one bead in the outer housing from an outside surface thereof, wherein the at least one bead has a bead opening angle with a value ranging from 160° to 170° and wherein the at least one bead mechanically relieves a welded joint in the manner of a knee joint and is not used for any further functions specific to the gas generator; and
 c) closing the outer housing with a closing element, with a portion of the closure element being inserted within the outer housing.

6. The method according to claim 5, wherein the at least one bead is produced in the form of a plurality of beads, that are radially peripherally disposed along a longitudinal axis of the gas generator, to be spaced substantially equally along the longitudinal axis.

7. The method according to claim 5, wherein the outer housing is provided for the gas generator as part of a pre-mounted gas generator assembly in which the outer housing is in the form of a compressed-gas container filled with a compressed gas at a pressure ranging from 400 bars to 600 bars, wherein the compressed-gas container is closed to the outside by the welded joint in a pressure-tight manner.

8. The method according to claim 5, wherein the outer housing for the gas generator is provided as a separate component part and wherein after producing the at least one bead the following further steps are taken:
 c) installing further component parts for the gas generator inside the outer housing
 d) filling the outer housing with a compressed gas at a pressure ranging from 400 bars to 600 bars;
 e) closing the housing in a pressure-tight manner at the housing end and at an another end of the outer housing that is axially opposed to the housing end; and
 f) further installing a diffusor at the another end on the outer housing.

9. The gas generator of claim 5, wherein the welded joint is formed as one of a laser welding, resistance welding and friction welding.

10. The gas generator of claim 5, wherein the at least one bead is formed of a continuous radially peripheral recess that reduces an outer diameter of the housing in a region of the at least one bead by a bead diameter.

11. A gas generator for a vehicle safety system, with a longitudinal axis, an outer housing in the form of a compressed-gas container which, in an inoperative state of the gas generator, is filled with compressed gas, wherein the outer housing is closed at one housing end with a closure element by a welded joint, wherein the closure element extends along the longitudinal axis from the welded joint into the outer housing, wherein the outer housing has at least one bead in the form of a continuous radially peripheral recess, wherein the bead can be moved elastically along with a corresponding change of internal pressure within the compressed-gas container for mechanically relieving the welded joint in a manner of a knee joint, wherein a bead base of the bead is arranged in a region of an axial longitudinal extent of the closure element, and wherein the closure element is a solid component part which, in a region of the welded joint, when viewed in a cutting plane normal to the longitudinal axis of the gas generator, has a larger material thickness than the housing end in a range of 1.2 to 3-fold more than the material thickness of the housing end.

12. The gas generator according to claim 11, wherein the outer housing is tube-shaped and wherein the at least one bead extends from an outside surface of the outer housing, radially inwardly.

13. The gas generator according to claim 11, wherein the closure element is in the form of an igniter unit.

14. The gas generator according to claim 11, wherein a bead base of the at least one bead is positioned toward the housing end at an axial distance of from 5 mm to 30 mm and is disposed substantially in a middle of the axial longitudinal extent of the closure element.

15. The gas generator according to claim 11, wherein the at least one bead is configured as a plastic deformation, in the form of a crimping, flaring, embossing or roller-burnishing at the outer housing of the gas generator, wherein the at least one bead is movable in response to a pressure increase inside the gas generator, to the outside toward a direction of movement substantially normal to the longitudinal axis of the gas generator.

16. A vehicle safety system, comprising a gas generator, an airbag inflatable by the gas generator as part of an airbag module, and an electronic control unit operatively connected to the gas generator wherein the electronic control unit activates the gas generator when a release situation is given, wherein the gas generator is configured according to claim 11.

17. The gas generator of claim 11, wherein the peripheral recess reduces an outer diameter of the outer housing in the region of the at least one bead by a bead diameter.

18. The gas generator of claim 11, wherein the closure element protrudes outwardly from the outer housing along the longitudinal axis.

19. The gas generator of claim 18, wherein the recess defines a bead base having a maximum bead depth within the range of 0.5 mm to 2 mm.

20. The gas generator of claim 18, wherein the bead has a bead opening angle with a value ranging from 160° to 170°.

\* \* \* \* \*